United States Patent
King et al.

(10) Patent No.: US 6,967,726 B2
(45) Date of Patent: Nov. 22, 2005

(54) MEANS FOR IN-PLACE AUTOMATED CALIBRATION OF OPTICALLY-BASED THICKNESS SENSOR

(75) Inventors: Harriss T. King, Cupertino, CA (US); Wesley D. French, San Jose, CA (US); Steve Axelrod, Los Altos, CA (US); Scott C. Wiley, Los Altos, CA (US)

(73) Assignee: Honeywell International Inc., Morristown, NJ (US)

(*) Notice: Subject to any disclaimer, the term of this patent is extended or adjusted under 35 U.S.C. 154(b) by 223 days.

(21) Appl. No.: 10/679,198

(22) Filed: Oct. 3, 2003

(65) Prior Publication Data

US 2005/0073694 A1 Apr. 7, 2005

(51) Int. Cl.[7] .............................................. G01B 11/28
(52) U.S. Cl. ..................... 356/630; 356/631; 324/229; 324/231
(58) Field of Search ................................ 356/630–632, 356/635, 637, 602, 614, 615, 622, 623, 429, 356/430, 431; 250/201.6, 559.22, 559.23, 250/559.24, 559.27, 559.28; 324/226–231; 33/501.02, 544.5, 544.6

(56) References Cited

U.S. PATENT DOCUMENTS

| | | | |
|---|---|---|---|
| 4,107,606 A | 8/1978 | Typpo et al. ................ 324/229 |
| 4,276,480 A | 6/1981 | Watson ........................ 250/560 |
| 4,678,915 A | 7/1987 | Dahlquist et al. ........... 250/358 |
| 5,010,766 A | 4/1991 | Typpo ........................... 73/159 |
| 5,210,593 A | 5/1993 | Kramer ....................... 356/381 |
| 5,299,447 A | 4/1994 | Caron ............................. 73/3 |
| 5,355,083 A | 10/1994 | George et al. .............. 324/229 |
| 5,715,514 A | 2/1998 | Williams et al. ............. 399/395 |
| 5,754,294 A * | 5/1998 | Jones et al. ................. 356/503 |
| 5,900,938 A | 5/1999 | Huang ......................... 356/358 |
| 6,281,679 B1 | 8/2001 | King et al. ................. 324/229 |
| 6,369,898 B1 | 4/2002 | Van Saarloos et al. ..... 356/497 |
| 6,538,459 B1 | 3/2003 | Sticha ........................ 324/663 |
| 2003/0038933 A1 | 2/2003 | Shirley et al. | |

* cited by examiner

Primary Examiner—Gregory J. Toatley, Jr.
Assistant Examiner—Roy M. Punnoose
(74) Attorney, Agent, or Firm—Fliesler Meyer LLP; Charles H. Jew

(57) ABSTRACT

The calibration of a laser caliber is described. The laser caliber uses first and second sensors to determine the distance to different sides of a sheet. A third sensor is used to determine the distance between the first and second sensors. The calibration of the first, second, and third sensors is done by positioning a test object onto the platform sensed by the third sensor. The platform is moved to multiple positions in order to calibrate the first, second and third sensors. Since the displacement of the platform moves the distance to the target of the first, second and third sensors the same amount, the sensors can be accurately calibrated for a number of different positions of the test object. A very accurate calibrating displacement measuring device such as an LVDT can be used.

17 Claims, 3 Drawing Sheets

MEANS FOR IN-PLACE AUTOMATED CALIBRATION OF OPTICALLY-BASED THICKNESS SENSOR

FIELD OF THE INVENTION

The present invention relates generally to non-contacting, thickness measurements using a caliper sensor.

BACKGROUND

Multiple methods exist for measuring the thickness of moving sheet such a paper. One common method is a direct thickness measurement using contacting guides, which skim along the two surfaces of the sheet. Since this method contacts the sheets, the method is limited by the strength of the material being measured. With fragile sheets such as tissue, there is a tendency for contacting gauge to snag the sheet surface causing flaws in the sheet or causing the sheet to tear. Additionally, sheets can damage the caliper sensor due to abrasion. Additionally the accuracy of the contacting is reduced as contaminants are built up on the contacting elements, which can occur with coating sheets containing recycled materials.

Another common method is a non-contacting inferential method in which radiation absorption by the sheet is used to determine the thickness of the sheet. The disadvantage of using the inferential thickness measurement with radiation absorption is that if the density of the sheet is not as predicted there can be errors in the calculated thickness.

A number of systems suggest the use of lasers to measure the thickness of moving web. Such laser systems are described in the U.S. Pat. No. 5,210,593 to Kramer and U.S. Pat. No. 4,276,480 to Watson. In such system the laser source on both sides of the web are used to determine a distance on one side of the sheet. The distances are added together and the result is subtracted from a known distance value between the two lasers to determine the sheet thickness.

An improved method is used to compensate for the possibility of changes in the distance between the two laser sensors. A prior art system is shown in FIG. 1. In this example, a Z Coil sensor 102 is used to detect the distance between the laser sensor 104 and the laser sensor 106. Typically, the Z Coil sensor comprises of an RF coil at the upper sensor enclosure that is fixed with respect with the top sensor 104 and flat topped metal dome target at the lower sensor closure that is fixed with respect to the lower laser sensor 106. The coil is typically symmetrically placed with the upper and lower laser to avoid alignment effects that can otherwise arise from a relative tilt between the upper and lower laser sensors assemblies.

For thickness measurement applications such as paper and plastic sheets, the accuracy requirement for relative position thickness changes across the sheet is often less than a micron. This implies that each of the measurement devices needs to be very accurate and stable, especially in terms of their calibration with respect to one another. In a typically scanning implantation, the requirements are very severe since the measured distances can each change significantly (several hundred microns) across the product width due to the movement of the sheet between the lasers or changes in the distance between the lasers as the scanning sensor enclosures move back and fourth.

Laser sensors and Z sensors have some level of drift over time due to temperature or ageing effects. Even if a device is perfectly calibrated at time zero, it will tend to drift out of perfect alignment in the course of hours, days or weeks.

Currently, calibration measurements are done by halting the normal sensor operations and removing the devices from the sensor for recalibration on a periodic basis using a highly accurate means such as an interferometer. The calibration needs to be done at each mill where a sensor installed and skilled people need to be trained at each mill to carry out this procedure. This can be a very expensive proposition.

It is difficult to know when recalibration is needed. This need is often known only after the sensor has already produced inaccurate thickness measurements. Further, there is no guarantee that a calibration done off-line remains accurate when the devices are remounted on to the caliber. For example, a RF coil Z sensor is a proximity sensor that is extremely sensitive to the presence and orientation of near by metal objects. Even tiny differences in the nature and surroundings of the sensor can lead to unacceptable errors in the Z sensor readings.

DETAILED DESCRIPTION

In one embodiment, a first sensor determines a first distance from the first sensor to a first side of the object. A second sensor determines a second distance from the second sensor towards a second side of the object. A third sensor is used to determine a third distance from the third sensor to the platform. A platform is operably connected to a translation device to move the platform with respect to the sensor. The platform is also operably connected to a displacement measuring device to determine the displacement of the platform. During the normal operation, the sensors determines the thickness of the object. During a calibration operation, the displacement measuring device is used to calibrate the sensors. In one embodiment, a sheet is the object in normal operation, while a calibration object such as a flag can be used to calibrate the sensors during calibration operation.

Figure 1:
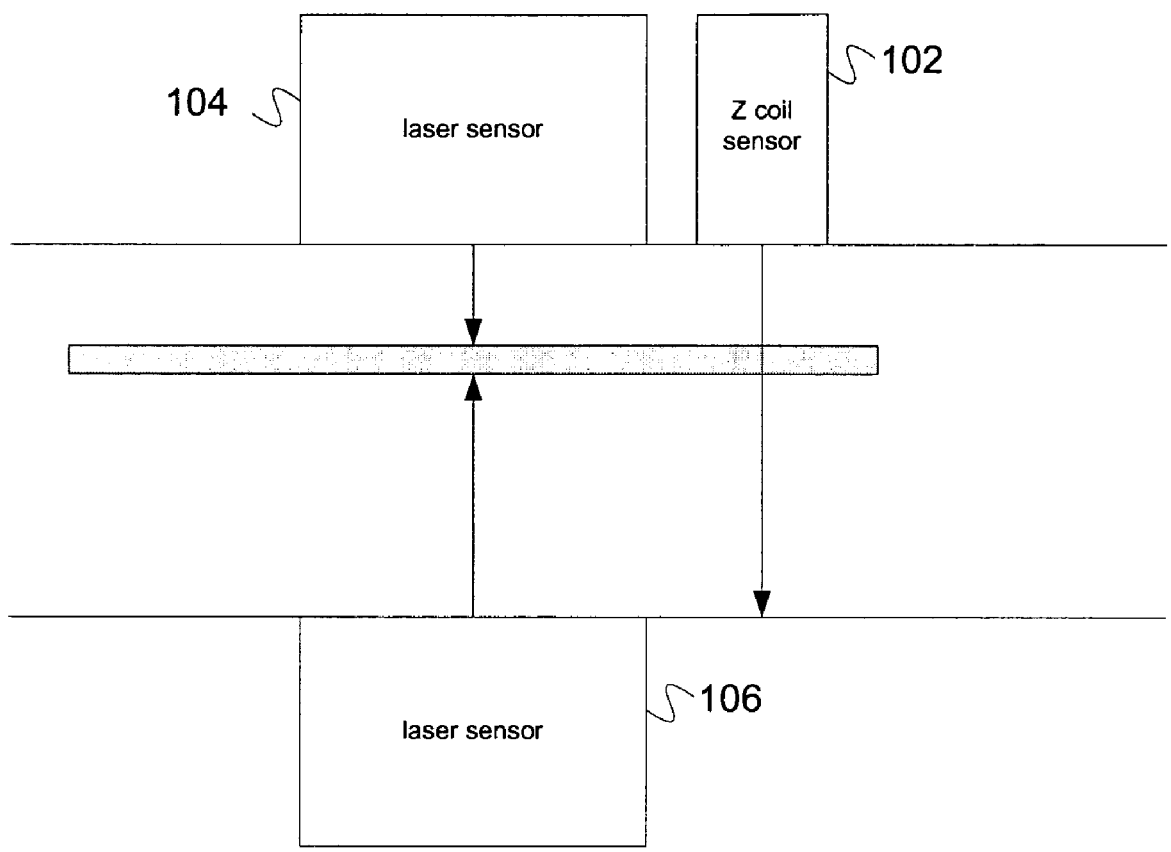
FIG. 1 shows a prior art system for measuring the thickness of a sheet.
Figure 2:
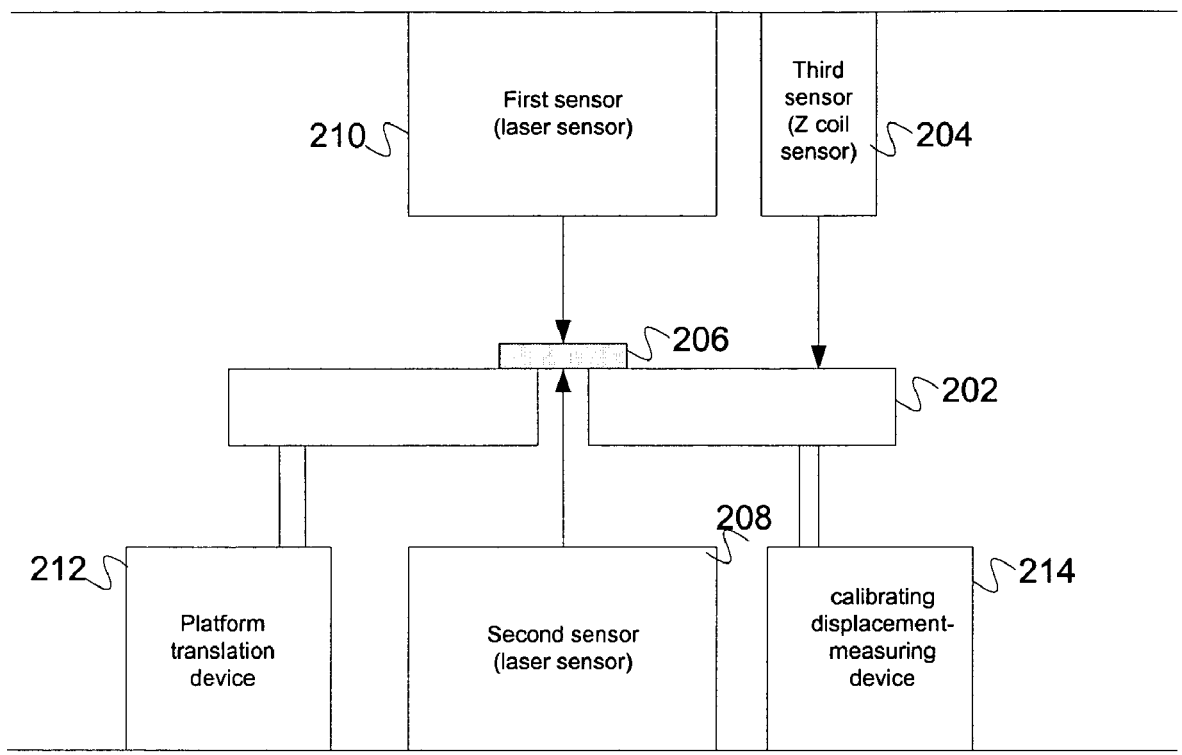
FIG. 2 is a diagram that illustrates a calibration system of the present invention.

FIG. 2 illustrates a system for the internal calibration of the laser caliber. This system uses a platform 202, which is preferably a metal dome structure that serves as a target for the Z sensor 204. The Z sensor can be an RF coil system that induces eddy currents into a metal platform and measures the impedance of the system to get an indication of the distance to the platform. A calibration object 206 can be placed onto the platform 202. The calibration object 206 is preferably a material with characteristics similar to the objects to be detected during the normal operation. The test object needs to be relatively rigid so the thickness of the calibration object can be greater than the sheet used in normal operation. In one embodiment, a plastic object is used. The object 206 can be retractable and a protective window can be inserted to protect the laser sensor 208. A similar window can be used for the first sensor 210.

The first and second sensors 210 and 208 can be laser sensors. One example of a laser sensor is a laser triangulation sensor. Laser triangulation sensors shine a spot perpendicularly onto the sheet. A light detector at an oblique angle to the sheet detects the spot and thus can be used to produce an indication of the distance to the sheet. Other sensors to detect the object from two different sides can also be used.

The third sensor can be a variety of different sensors that can sense through the object. This can include RF receiver coils, hall effect devices and magneto-resistive devices.

The top and bottom portions of the third sensor can be positioned on shuttles that move back and forth across the sheet.

The platform 202 can be mounted to a platform positioning device 212 such as a precision slotting stage. In the preferred embodiment, the platform device 202 can be translated in a vertical direction over the measurement ranges of the first sensor 210, the second sensor 208 and third sensor 204. The first sensor 210, second sensor 208 and third sensor 204 sense the same displacement change at the same time. The platform positioning device 212 in one embodiment includes in a sliding mechanism attached to a linear motor, for example a stepper motor with a lead screw with a desired pitch, or server motor. The motor can move the platform 102 in small steps across the full calibration range as desired, and when not moving, is capable of holding the platform 202 in a perfectly fixed position. Multiple calibration steps can be done across the calibration range and when the calibration is complete and the platform 202 can be returned to a fixed home position for the measurement of the product itself. In one embodiment, attached to the sliding mechanism is a highly accurate stable repeatable calibrating measurement device 214. The calibrating measurement device 214 is used to determine a very accurate indication of the displacement steps used during calibration. A variety of devices could be used for the calibrating measurement device 214. In one embodiment, a Linear Variable Differential Transformer (LVDT) is used. The advantages of a LVDT include resolution, repeatability, stability, ease of use and low cost. The calibrating displacement measuring device 214 is first calibrated against an absolute standard such as the interferometer. The calibrating measuring device 214 is then installed in the calibrating sensor to serve as a secondary standard for calibrating the lasers and the first and second sensors 210 and 208 and the third sensor 204. As the platform 202 is moved up and down, the measurements are used to accurately qualify the displacement changes made by the platform. These displacement changes are then used along with the measured laser and the Z sensor outputs to calibrate the devices. Since all three of the devices are calibrated at the same time and against the same standard they are very accurately cross-calibrated even if their absolute accuracy is limited by the accuracy of the calibrating displace measurement device 214.

It is important that the first, second and third sensors are cross-calibrated. For example, if there is an identical 1% error in the sensor activity of each of the three sensors the error in the determined thickness would also be 1% regardless how the sheet moves up or down or how the gap between the first sensor and the second sensor changes. In this example the profile of the thickness variation across the sheet will be perfectly accurate except for 1% error of the size of the peaks and valleys. This is an acceptable accuracy for the thickness profile measurement. However, if these devices are not cross-calibrated and there is a 1% error in only one sensor can cause a totally unacceptable situation. For example, if the first sensor 210 has a small percentage error, change in sheet position within the gap or change in the Z gap itself during the course of the scan across the sheet will generally be many microns. For example if the sheet is one micron thick and each of the sensors is crossed calibrated with a 1% offset in the same direction there will be a $\frac{1}{100}$ of a micron variation of the sheet position. If the first or second sensor is off by 1% and the other sensor are completely accurate and the sheet varies in position of 1000 microns, the error in the thickness can be 10 micron which is very considerable compared to the thickness of the sheet being measured.

Figure 3:
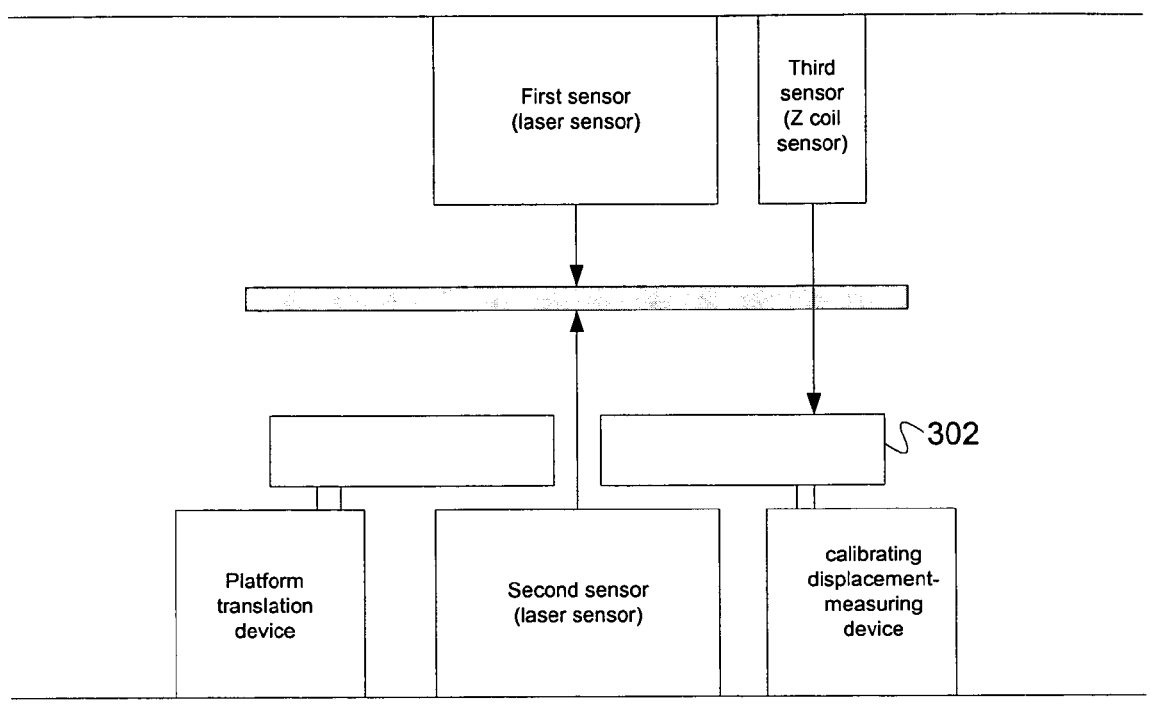
FIG. 3 is a diagram that illustrates the operation of the system of one embodiment of the present invention under normal conditions.

FIG. 3 of the diagram, which illustrates the platform 302 in its rest position for the normal operation.

In one embodiment, periodically the user can place the target object onto the platform and perform the calibration. In one embodiment, calibration data from a wide variety positions of the target object is obtained. In this embodiment, measured values from the three sensors are sent to a processor, which calculates the thickness of the sheet taking into account the calibration information. In one embodiment, indications from each of the sensors can be converted into calibrated values using look-up table and these calibrated values then can be used to calibrate the device.

In one embodiment, voltage readings from the three sensors are calibrated against the calibration distance measurement device. In one embodiment, for a range of calibration measurement device positions, the voltage output of the three sensors are obtained. These voltage outputs are calibrated to indicate the distance measurement of the calibration measurement device. For example, when the calibration measurement device has a value '0' the other three sensors are calibrated to the value '0'. This means that the equation for the thickness is given by thickness=Z−(LTop+L Bottom)+Offset. When the platform is at the '0' value, offset equals the thickness of the test object.

In one embodiment, the calibration of the three sensors is used to produce an equation for a linear best fit, (d=a (voltage)+b), to the calibrating curve. A voltage error for that sensor voltage is calculated and stored such that the d=a (output voltage+error)+b.

The calibration operation can be used to determine number of output voltage and error pairs. A look-up table for the pairs can be populated by interpolating nearby error valves. The output voltage is used to look-up the error. In one embodiment, the output voltage is converted to an index that is used to find the error. The error is added to the output voltage and used to calculate the distance for the sensor. The three distances for the sensors is used to produce the thickness value.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system comprising:
    a first sensor to determine a first distance from the first sensor to a first side of an object;
    a second sensor to determine a second distance from the second sensor to a second side of the object;
    a third sensor to determine a third distance from the third sensor to a platform, wherein the platform is operably connected to a translation device to move the platform with respect to the sensors and operably connected to a displacement-measuring device to determine the displacement of the platform, wherein during normal operation the sensors are used to determine the thickness of the object, and during calibration operation the displacement-measuring device is used to calibrate the sensors.

2. The system of claim 1, wherein the first and second sensors are laser sensors.

3. The system of claim 1, wherein the third sensor is an RF coil sensor.

4. The system of claim 1, wherein the third sensor senses through the object during normal operation.

5. The system of claim 1, wherein the displacement measurement device is a linear variable differential transformer.

6. The system of claim 1, wherein the translation device includes a stepper motor.

7. The system of claim 1, wherein the platform is connected to a sliding mechanism to slide the platform back to the second sensor.

8. The system of claim 1, wherein a processor is used to calculate the thickness of the object during normal operation, the calculation using the previously determined calibration data.

9. A method comprising:
   in a normal mode, using a first sensor to determine a first distance from the first sensor to a first side of an object, using a second sensor to determine a second distance from the second sensor to a second side of the object, using a third sensor to determine a third distance from the third sensor to a platform, wherein the sensors are used to determine the thickness of the object; and
   in a calibration mode, a displacement-measuring device is used to calibrate the sensors, wherein the platform is operably connected to a translation device to move the platform with respect to the sensors and operably connected to the displacement-measuring device to determine the displacement of the platform.

10. The method of claim 9, wherein the first and second sensors are laser sensors.

11. The method of claim 9, wherein the third sensor is an RF coil sensor.

12. The method of claim 9, wherein during normal operation the third sensor senses through the object.

13. The method of claim 9, wherein the displacement measuring device is a linear variable differential transformer.

14. The method of claim 9, wherein during the calibration mode a stepper motor translates the platform.

15. The method of claim 9, wherein a sliding mechanism connects the platform is used to translate the platform with respect to the second sensor.

16. The method of claim 9, wherein during normal mode the processor is used to calculate the thickness.

17. The method of claim 16, wherein the calculator uses the calibration offsets in the determination of the thickness.

* * * * *